United States Patent [19]
Chen

[11] 3,767,568

[45] Oct. 23, 1973

[54] HYDROCARBON CONVERSION

[75] Inventor: Nai Yuen Chen, Titusville, N.J.

[73] Assignee: Mobil Oil Corporation, New York, N.Y.

[22] Filed: Mar. 19, 1971

[21] Appl. No.: 126,092

Related U.S. Application Data

[63] Continuation-in-part of Ser. No. 27,253, April 13, 1970, and a continuation-in-part of Ser. No. 101,231, Dec. 24, 1970, and a continuation-in-part of Ser. No. 119,047, Feb. 25, 1971.

[52] U.S. Cl................ 208/134, 208/63, 208/65, 208/DIG. 2
[51] Int. Cl................ C10g 35/06, C10g 39/00
[58] Field of Search............ 208/62, 63, 65, 138, 208/34, DIG. 2; 252/455 Z

[56] References Cited
UNITED STATES PATENTS

| | | | |
|---|---|---|---|
| 3,287,253 | 11/1966 | McHenry et al.............. | 208/65 |
| 3,376,214 | 4/1968 | Bertolacini.................. | 208/138 |
| 3,395,094 | 7/1968 | Weisz......................... | 208/62 |
| 3,551,353 | 12/1970 | Chen et al................... | 252/455 Z |
| 3,553,103 | 1/1971 | Burbidge et al............. | 208/111 |
| 3,578,398 | 5/1971 | Jenkins....................... | 252/455 Z |
| 3,578,723 | 5/1971 | Bowes et al.................. | 252/455 Z |
| 2,940,926 | 6/1960 | Henke et al.................. | 260/676 MS |
| 2,917,449 | 12/1959 | Christensen et al.......... | 260/676 MS |
| 2,935,459 | 5/1960 | Hess et al.................... | 208/65 |
| 3,247,098 | 4/1966 | Kimberlin.................... | 208/120 |
| 3,664,949 | 5/1972 | Petersen et al.............. | 208/138 |
| 3,663,426 | 5/1972 | Mikovsky et al............. | 208/65 |

*Primary Examiner*—Herbert Levine
*Attorney*—Andrew L. Gaboriault and Oswald G. Hayes

[57] ABSTRACT

This disclosure relates to a method of improving the yield-octane number relationship of a reformate or reformer effluent by contacting the same at conversion conditions in the presence of hydrogen with crystalline aluminosilicate zeolites characterized by (1) having a silica to alumina ratio greater than 15 (preferably greater than 20); (2) having been crystallized from a solution containing organic cations so that the aluminosilicate as synthesized contains organic cations and (3) having pore sizes such that the aluminosilicate sorbs methyl paraffins at said conversion conditions. The upgrading of reformate or reformer effluent can take place with or without added hydrogen and with or without a hydrogenation/dehydrogenation component.

16 Claims, 1 Drawing Figure

INVENTOR
NAI YUEN CHEN

HYDROCARBON CONVERSION

This application is a Continuation-in-Part of Ser. No. 27,253, filed Apr. 13, 1970; Ser. No. 101,231, filed Dec. 24, 1970; and, Ser. No. 119,047, filed Feb. 25, 1971.

BACKGROUND OF THE INVENTION

The upgrading of reformates to improve the octane number of gasolines, as well as the yield-octane relationship has been the subject of much activity in the petroleum industry over the years. Recently, however, because of the greater awareness of the problem of environmental control, as well as air pollution, greater impetus has been given to investigations directed towards increasing the octane number of gasoline. Quite obviously, processes which will increase the octane number of gasoline are extremely desirable since they will either eliminate the use of lead or minimize the amount of lead needed to raise the product to still higher octane levels.

SUMMARY OF PRIOR ART

It has long been known to upgrade a reformate by a wide variety of techniques including treatment with crystalline aluminosilicate zeolites. The treatment of a reformate with crystalline aluminosilicate zeolites heretofore practiced has included both physical treatments such as selective adsorption, as well as chemical treatments such as selective conversion.

Although the prior art procedures for treatment of a reformate differed, nevertheless, they had one common characteristic in that substantially all involved the use of crystalline aluminosilicates having a pore size of about 5 Angstrom units. Another way of saying the same thing is to state that substantially all prior art procedures for upgrading reformates with zeolites were concerned with those zeolites which would admit normal paraffins and exclude isoparaffins. This was not too surprising since it was known in the prior art that the undesirable components in a reformate generally speaking, were normal paraffins whereas other components of a reformate, i.e., the aromatics and isoparaffins, were valuable products. Thus, the prior art directed its activities toward the use of zeolites which would selectively remove the normal paraffins and leave the aromatics and/or isoparaffins in the reformate.

Thus, U.S. Pat. Nos. 2,851,970 and 2,886,508 are directed towards a reforming process where a naphtha is first reformed and the reformate or a portion thereof contacted with a 5 Angstrom unit aluminosilicate in order to selectively sorb out the normal paraffins.

U.S. Pat. No. 3,114,696 represented a substantial improvement in the problem of upgrading a reformate since it was directed towards the concept of treating a reformate with a crystalline aluminosilicate having a pore size of 5 Angstroms under cracking conditions so as to selectively crack out the normal paraffins.

U.S. Pat. No. 3,395,094 represented a still further advance in the overall problem of upgrading a reformate. This patent was directed towards the concept of hydrocracking the normal paraffins out of a reformate with a crystalline aluminosilicate having a pore size of about 5 Angstrom units and having hydrogenation activity limited to the internal pore structure thereof. This patent realized that not only was it necessary to selectively crack out normal paraffins, but also to preserve the aromatic constituents of the feed while this operation was being carried out.

DESCRIPTION OF THE INVENTION

It has now been discovered that improved results can be obtained in the catalytic treatment of a reformate or reformer effluent with respect to both octane number and overall yield if such is converted with a crystalline aluminosilicate characterized as (1) having a silica to alumina ratio greater than 15 (preferably greater than 20, (2) having been crystallized from a solution containing organic cations so that the aluminosilicate as synthesized contains organic cations which in part satisfy the electronegative property of the aluminum atoms in the crystal lattice and (3) having a pore size such that the aluminosilicate sorbs methyl paraffins at reaction conditions.

The reason or reasons why the particular zeolites employed in the novel process of this invention give improved results with regard to the upgrading of reformates or reformer effluents is not completely understood. As has heretofore been pointed out, the concept of contacting a reformate with a crystalline aluminosilicate zeolite is old in the art. However, the reformate upgrading processes heretofore practiced always involved the use of crystalline aluminosilicate zeolites which had a pore size of about 5 Angstrom units, i.e., it had long been known in the art that normal paraffins constituted an undesirable portion of a reformate and the prior art efforts were directed towards utilizing crystalline aluminosilicate zeolites which could remove these undesirable normal paraffins. The prior art processes for the removal of normal paraffins in a catalytic fashion were carried out either in the absence of hydrogen such as in aforementioned U.S. Pat. No. 3,114,696 or in the presence of hydrogen such as disclosed and claimed in U.S. Pat. No. 3,395,094.

All the zeolites employed in the novel process of this invention have pore sizes such that they admit methyl-substituted paraffins and, as such, inherently have a pore size greater than about 5 Angstrom units. Thus, if one were to employ the measure of selectivity heretofore employed in the prior art, i.e., the ability to selectively sorb a normal paraffin from a mixture of the same with an iso-paraffin, all the catalysts employed in the novel process of this invention would fail said test and would generally be classified as not being "shape selective" since that term in the art is generally understood to apply to zeolites having a pore size of about 5 Angstrom units. It is noted, however, that selectivity as to shape is theoretically possible at any shape or size, although such selectivity might not necessarily result in an advantageous catalyst for a particular hydrocarbon conversion reaction desired.

It is to be immediately understood, however, that the difference between the catalyst employed in the instant invention and those of the prior art is not merely one of pore size since, quite obviously, large pore size zeolites have long been known in the art and, indeed, large pore zeolites have been extremely effective in a wide variety of hydrocarbon conversion processes, such as the catalytic cracking of gas oil to produce gasoline. U.S. Pat. Nos. 3,140,251; 3,140,252; 3,140,253; and 3,140,249 are some examples of patents disclosing and claiming the use of large pore zeolites in hydrocarbon conversion processes.

It would appear that the key to obtaining an extremely efficient process for upgrading a reformate or a reformer effluent involves carefully controlling the desired reactions and minimizing undesired reactions. Thus, for example, as has heretofore been stated, normal paraffins can be generally stated to be undesirable and a successful process should be able to selectively remove normal paraffins. However, the novel process of this invention does something more than merely remove normal paraffins in that what also appears to be occurring is a simultaneous alkylation of at least a portion of the aromatic rings of aromatic feed with products of cracking of normal and/or slightly branched paraffins thereby resulting in higher alkylated aromatic rings in the product. Thus, by way of considerable oversimplification, the novel process of this invention does not merely remove undesirable materials as was practiced in the prior art processes, but rather, removes the undesirable materials and uses them to form alkyl aromatics both directly and by alkylation of aromatics in the feed, thereby resulting in a high yield of desirable products.

As can well be appreciated in order to arrive at a successful process, it is necessary that the catalyst employed be able to perform the aforementioned functions during long periods of time and with a great deal of efficiency and selectivity otherwise an inordinate amount of regeneration must take place which seriously affects the overall economy of the operation.

Thus, for example, it is known in the art that alkylation of aromatics can take place with large pore zeolites which have not been synthesized from a solution containing an organic cation and which do not contain organic cations as synthesized. Typical large pore zeolites known in the art to have alkylation activity in various ion exchanged forms include materials of the faujasite family, particularly X and Y. However, at the reaction conditions involved in the upgrading of a reformate or reformer effluent large pore materials of the prior art such as X and Y do not maintain their alkylation activity for any appreciable length of time which renders them useless in a commercial operation utilizing the reaction condition commonly encountered in the upgrading of reformates.

While not wishing to be bound by any theory of operation, nevertheless, it appears that the reason why the prior art large pore size catalysts are inferior in the upgrading of reformates is due to the fact that in order to obtain a maximum efficiency a catalyst must possess cracking activity so as to be able to crack out the normal paraffins and must also possess alkylation activity so as to form alkyl aromatics. In general, all the prior art catalysts suffer from the disadvantage that a good cracking catalyst under a prescribed set of operating conditions was usually a very poor alkylation catalyst and the converse was also true, i.e., a good alkylation catalyst under a particular set of operating conditions was a poor cracking catalyst. In order for a catalyst to be successful in the environment of upgrading a reformate, it is necessary that it have both a cracking and an alkylation function and that said cracking and alkylation function be stable over long periods of time so that the catalyst does not age in an inordinately short period of time.

Additionally, it is also noted that it is not merely enough to have a catalyst which is capable of producing desired products but that it is also a necessary prerequisite that the desired products be preserved during the course of the reaction. Thus, for example, with respect to the formation of alkyl aromatic hydrocarbons, it is not only necessary that a catalyst be able to produce the same but also that the alkyl aromatic hydrocarbons be preserved during the course of the reaction.

For reasons which are not completely understood, it has been found that zeolites which are crystallized from a solution containing organic cations and which contain an organic cation as synthesized such that the organic cations satisfy at least in part the electronegative property of the aluminum atoms in the crystal lattice are, indeed, very effective catalysts for the upgrading of reformates when they also contain the other characteristics previously referred to with respect to the silica to alumina ratio and the pore size such that methyl paraffins are sorbed at reaction conditions. The effectiveness of catalysts of this type can stem from a wide variety of factors but paramount is the fact that they are able to maintain their selectivity for desired reaction products over prolonged periods of time, i.e., these materials are highly stable and highly selective during the reaction conditions which must be utilized. The formation of crystalline aluminosilicates from solutions containing organic cations is known in the art as a synthesis technique and it has been discovered that any organic cation will function providing the zeolite possesses the other characteristics above described. However, particular preference is given to those aluminosilicates which are synthesized from solutions containing alkyl ammonium and alkyl phosphonium cations.

Representative crystalline aluminosilicate zeolites which have the characteristics previously set forth include zeolite Beta, TEA mordenite, ZSM-12 and a family of zeolites referred to as ZSM-5 type which includes as members ZSM-5, ZSM-8 and ZSM-11.

Zeolite Beta is a well known zeolite synthesized from a solution containing tetraethylammonium ions and is described and claimed in U.S. Pat. No. 3,308,069.

TEA mordenite is also synthesized from a solution containing tetraethylammonium ions and has the following formula in terms of mole ratios of oxides in its synthesized form:

$$M_{2/n}O : Al_2O_3 : 15\text{-}100 \ SiO_2 : 0\text{-}15 \ H_2O$$

wherein M is a mixture of cations, at least one of which is tetraalkylammonium and n is the valence of M.

TEA mordenite has the crystal structure of mordenite.

TEA mordenite is disclosed and claimed in copending application Ser. No. 795,694, filed Jan. 31, 1969.

ZSM-12 as synthesized has a formula in terms of mole ratios of oxides as follows:

$$1.0 \pm 0.4 \ M_{2/n}O : Al_2O_3 : 20\text{-}100 \ SiO_2 : z \ H_2O$$

wherein M is a mixture of cations at least one of which is tetraalkylammonium, n is the valence of cations M and z is 0–60.

It is disclosed and claimed in copending application Ser. No. 125,749, filed Mar. 18, 1971.

However, the most preferred zeolites which are employed in the novel reforming processes of this invention are those zeolites which are generally referred to as being ZSM-5 type materials. ZSM-5 type zeolites which are used in the novel conversion process of this invention can be generally stated to have a pore size greater than the 5 Angstrom materials and less than the large pore zeolites such as zeolite X, zeolite Beta, etc.

Before the discovery of the ZSM-5 type zeolites all the crystalline aluminosilicates heretofore employed in the prior art conversion processes fell into one of two general types. They either had pore sizes of about 5 Angstrom units or had pore sizes of from about 6 to abut 15 Angstrom units. The 5 Angstrom unit aluminosilicates were generally stated to be shape selective in that they allowed selective conversion of normal aliphatic compounds from a mixture of the same of iso-aliphatic compounds and cyclic compounds. The second type of aluminosilicate, i.e., those generally stated as having a pore size of 6 to 15 Angstrom units will admit both normal and iso-aliphatic compounds. Thus a very convenient method of identifying a good shape selectively catalyst was to show that it would selectively sorb hexane from a mixture of the same with 2-methyl pentane since the former compound was able to enter its internal pore structure whereas the latter isocompound was unable to do so.

The ZSM-5 type zeolites which are used in the novel conversion process of this invention can generally be stated to be intermediate between the two types of aluminosilicates previously described. Thus, the ZSM-5 type catalysts used in the novel process of this invention will allow the entry into their internal pore structure of normal aliphatic compounds and slightly branched aliphatic compounds, particularly monomethyl substituted compounds, yet impose a substantial barrier to the rate of diffusion of all compounds containing at least a quaternary carbon atom or having a minimum molecular dimension equal to or substantially greater than a quaternary carbon atom. Additionally, some aromatic and naphthenic compounds having side chains similar to the normal aliphatic compounds and slightly branched aliphatic compounds above described can enter the internal pore structure of the instant catalysts.

While not wishing to be bound by any theory of operation, nevertheless, it appears that the crystalline zeolitic materials of the ZSM-5 type employed in the instant invention cannot simply be characterized by the recitation of a pore size of a range of pore sizes. It would appear that the uniform pore openings of this new type of zeolite are not approximately circular in nature, as is usually the case in the heretofore employed zeolites, but rather, are approximately elliptical in nature. Thus, the pore openings of the instant zeolitic materials have both major and minor axis, and it is for this reason that the unusual and novel molecular sieving effects are achieved. This elliptical shape can be referred to as a "keyhole." It would appear that the minor axis of the elliptical pores in the zeolites apparently have an effective size of about 5.5 Angstrom units. The major axis appears to be somewhere between 6 and about 9 Angstrom units. The unique keyhole molecular sieving action of these materials is presumably due to the presence of these approximately elliptically shaped windows controlling access to the internal crystalline pore structure. In any event, irrespective of a particular molecular dimension or of the pore sizes of the ZSM-5 type catalyst the simple fact remains that outstanding results have been obtained when a reformate or reactor effluent is converted over a ZSM-5 type catalyst. It is noted that the word "converted" is being employed rather than stating that the reformate is cracked over a ZSM-5 type catalyst for the very simple reason that the mechanism which is involved, although inclusive of cracking of normal and slightly branched paraffins, is far broader than that specific reaction.

In fact, in one embodiment of this invention which will be referred to later on in this specification, a highly paraffinic $C_5$ plus naphtha fraction is deliberately added to the reformate or reformer effluent prior to its being converted over a ZSM-5 type catalyst. It has been found that a procedure of this type results in enhanced production of alkylaromatics, both directly and by alkylation of the aromatic components, thereby resulting in a more valuable product. Quite obviously, this procedure dramatically illustrates the difference in chemistry between the novel process of this invention and the heretofore practiced reformate upgrading processes. As can well be realized, a highly paraffinic naphtha fraction could never be blended with a reformate if the prior art type reformate upgrading processes were employed since the whole purpose of said prior art processes is to remove n-paraffins; therefore n-paraffins would not be deliberately added. Thus, in summary, it would appear that the fundamental distinction between the novel process of this invention and the heretofore practiced upgrading processes of the prior art resides in the fact that not only are certain undesirable compounds selectively removed, i.e., normal and slightly branched paraffins, but that these paraffins alkylate the aromatic portion of the reformate, thereby resulting in an enhanced yield of more desired products.

A further significant result of this chemistry is that dry gas make at the expense of the more valuable gasoline is very low. Methane formation is especially low; this has the advantage of minimal dilution of the recycle hydrogen and thus of optimum reformer operation.

ZSM-5 type zeolites which are employed in the process of this invention include not only ZSM-5 but also ZSM-8 and ZSM-11 zeolites.

ZSM-5 is disclosed and claimed in copending application Ser. No. 865,472, filed Oct. 10, 1969; ZSM-8 is disclosed and claimed in copending application Ser. No. 865,418, filed Oct. 10, 1969 and ZSM-11 is disclosed and claimed in copending application Ser. No. 31,421, filed Apr. 23, 1970.

The family of ZSM-5 compositions has the characteristic X-ray diffraction pattern set forth in Table 1 hereinbelow. ZSM-5 compositions can also be identified, in terms of mole ratios of oxides as follows:

$$0.9 \pm 0.2 \ M_{2/n}O : W_2O_3 : 15\text{--}100 \ YO_2 : z \ H_2O$$

wherein M is a cation, n is the valence of said cation, W is selected from the group consisting of aluminum and gallium, Y is selected from the group consisting of silicon and germanium, and z is from 0 to 40. In a preferred synthesized form, the zeolite has a formula, in terms of mole ratios of oxides as follows:

$$0.9 \pm 0.2 \ M_{2/n}O : Al_2O_3 : 15\text{--}100 \ SiO_2 : z \ H_2O$$

and M is selected from the group consisting of a mixture of alkali metal cations, especially sodium, and tetraalkylammonium cations, the alkyl groups of which preferably contain 2–5 carbon atoms.

In a preferred embodiment of ZSM-5, W is aluminum, Y is silicon and the silica/alumina mole ratio is at least 15, preferably 20 and ranges up to about 60.

Members of the family of ZSM-5 zeolites possess a definite distinguishing crystalline structure whose X-ray diffraction pattern shows the following significant lines:

TABLE 1

| Interplanar Spacing d(A) | Relative Intensity |
|---|---|
| 11.1 ± 0.2 | S |
| 10.0 ± 0.2 | S |
| 7.4 ± 0.15 | W |
| 7.1 ± 0.15 | W |
| 6.3 ± 0.1 | W |
| 6.04 ± 0.1 | W |
| 5.97 ± 0.1 | W |
| 5.56 ± 0.1 | W |
| 5.01 ± 0.1 | W |
| 4.60 ± 0.08 | W |
| 4.25 ± 0.08 | W |
| 3.85 ± 0.07 | VS |
| 3.71 ± 0.05 | S |
| 3.64 ± 0.05 | M |
| 3.04 ± 0.03 | W |
| 2.99 ± 0.02 | W |
| 2.94 ± 0.02 | W |

These values as well as all other X-ray data were determined by standard techniques. The radiation was the K-alpha doublet of copper, and a scintillation counter spectrometer with a strip chart pen recorder was used. The peak heights, I, and the positions as a function of two times theta, where theta is the Bragg angle, were read from the spectrometer chart. From these the relative intensities, 100 I/I, here I is the intensity of the strongest line or peak, and d(obs.), the interplanar spacing in A, corresponding to the recorded lines, were calculated. In Table 1 the relative intensities are given in terms of the symbols S = strong, M = medium, MS = medium strong, MW = medium weak and VS = very strong. It should be understood that this X-ray diffraction pattern is characteristic of all the species of ZSM-5 compositions. Ion exchange of the sodium ion with cations reveals substantially the same pattern with some minor shifts in interplanar spacing and variation in relative intensity. Other minor variations can occur depending on the silicon to aluminum ratio of the particular sample, as well as if it has been subjected to thermal treatment.

Zeolite ZSM-5 can be suitably prepared by preparing a solution containing water, tetrapropyl ammonium hydroxide and the elements of sodium oxide, an oxide of aluminum or gallium and an oxide of silica, and having a composition, in terms of mole ratios of oxides, falling within the following ranges:

TABLE 3

| | Broad | Preferred | Particularly Preferred |
|---|---|---|---|
| OH⁻/SiO₂ | 0.07–1.0 | 0.1–0.8 | 0.2–0.75 |
| R₄N⁺/(R₄N⁺+Na⁺) | 0.2–0.95 | 0.3–0.9 | 0.4–0.9 |
| H₂O/OH⁻ | 10–300 | 10–300 | 10–300 |
| YO₂/W₂O₃ | 5–100 | 10–60 | 10–40 | wherein R is propyl, W is aluminum and Y is silicon. This mixture is maintained at reaction conditions until the crystals of the zeolite are formed. Thereafter the crystals are separated from the liquid and recovered. Typical reaction conditions consist of a temperature of from about 75° to 175° C for a period of about 6 hours to 60 days. A more preferred temperature range is from about 90° to 150° C, with the amount of time at a temperature in such range being from about 12 hours to 20 days.

The digestion of the gel particles is carried out until crystals form. The solid product is separated from the reaction medium, as by cooling the whole to room temperature, filtering and water washing.

ZSM-5 is preferably formed as an aluminosilicate. The composition can be prepared utilizing materials which supply the elements of the appropriate oxide. Such compositions include, for an aluminosilicate, sodium aluminate, alumina, sodium silicate, silica hydrosol, silica gel, silicic acid, sodium hydroxide and tetrapropylammonium hydroxide. It will be understood that each oxide component utilized in the reaction mixture for preparing a member of the ZSM-5 family can be supplied by one or more initial reactants and they can be mixed together in any order. For example, sodium oxide can be supplied by an aqueous solution of sodium hydroxide, or by an aqueous solution of sodium silicate; tetrapropylammonium cation can be supplied by the bromide salt. The reaction mixture can be prepared either batchwise or continuously. Crystal size and crystallization time of the ZSM-5 composition will vary with the nature of the reaction mixture employed.

ZSM-8 can also be identified, in terms of mole ratios of oxides, as follows:

$$0.9 \pm 0.2 \; M_{2/n}O : Al_2O_3 : 15\text{--}100 \; SiO_2 : z \; H_2O$$

wherein M is at least one cation, n is the valence thereof and z is from 0 to 40. In a preferred synthesized form, the zeolite has a formula, in terms of mole ratios of oxides, as follows:

$$0.9 \pm 0.2 \; M_{2/n}O : Al_2O_3 : 15\text{--}60 \; SiO_2 : z \; H_2O$$

and M is selected from the group consisting of a mixture of alkali metal cations, especially sodium, and tetraethylammonium cations.

Zeolite ZSM-8 can be suitably prepared by reacting a water solution containing either tetraethylammonium hydroxide or tetraethylammonium bromide together with the elements of sodium oxide, aluminum oxide, and an oxide of silica.

The operable relative proportions of the various ingredients have not been fully determined and it is to be immediately understood that not any and all proportions of reactants will operate to produce the desired zeolite. In fact, completely different zeolites can be prepared utilizing the same starting materials depending upon their relative concentration and reaction conditions as is set forth in U.S. Pat. No. 3,308,069. In general, however, it has been found that when tetraethylammonium hydroxide is employed, ZSM-8 can be prepared from said hydroxide, sodium oxide, aluminum oxide, silica and water by reacting said materials in such proportions that the forming solution has a composition in terms of mole ratios of oxides falling within the following range:

SiO₂/Al₂O₃ — from about 10 to about 200
Na₂O/tetraethylammonium hydroxide — from about 0.05 to .020
Tetraethylammonium hydroxide/SiO₂ — from about 0.08 to 1.0
H₂O/tetraethylammonium hydroxide — from about 80 to about 200

Thereafter, the crystals are separated from the liquid and recovered. Typical reaction conditions consist of maintaining the foregoing reaction mixture at a temperature of from about 100° to 175° C for a period of time of from about 6 hours to 60 days. A more preferred temperature range is from about 150° to 175° C with the amount of time at a temperature in such range being from about 12 hours to 8 days.

ZSM-11 can also be identified, in terms of mole ratios of oxides, as follows:

$$0.9 \pm 0.3\ M_{2/n}O : Al_2O_3 : 20\text{--}90\ SiO_2 : z\ H_2O$$

wherein M is at least one cation, n is the valence thereof and $z$ is from 6 to 12. In a preferred synthesized form, the zeolite has a formula, in terms of mole ratios of oxides, as follows:

$$0.9 \pm 0.3\ M_{2/n}O : Al_2O_3 : 20\text{--}90\ SiO_2 : z\ H_2O$$

and M is selected from the group consisting of a mixture of alkali metal cations, especially sodium, and tetrabutylammonium cations.

ZSM-11 can be suitably prepared by preparing a solution containing $(R_4X)_2O$, sodium oxide, an oxide of aluminum or gallium, an oxide of silicon or germanium and water and having a composition, in terms of mole ratios of oxides, falling within the following ranges:

| | Broad | Preferred |
|---|---|---|
| $YO_2/WO_2$ | 10–150 | 20–90 |
| $Na_2O/YO_2$ | 0.05–0.7 | 0.05–0.40 |
| $(R_4X)_2O/YO_2$ | 0.02–0.20 | 0.02–0.15 |
| $H_2O/Na_2O$ | 50–800 | 100–600 | wherein $R_4X$ is a cation of a quaternary compound of an element of Group 5A of the Periodic Table, W is aluminum or gallium and Y is silicon or germanium maintaining the mixture until crystals of the zeolite are formed. Preferably, crystallization is performed under pressure in an autoclave or static bomb reactor. The temperature ranges from 100°–200° C generally, but at lower temperatures, e.g., about 100° C, crystallization time is longer. Thereafter the crystals are separated from the liquid and recovered. The new zeolite is preferably formed in an aluminosilicate form.

As has heretofore been stated, the ZSM-5 type zeolites are the preferred catalysts in the novel upgrading process of this invention. For reasons which are not completely understood, these materials give greater yields of higher octane product and have an extraordinary stability over prolonged periods of time.

It is to be noted that although one of the characteristics of all crystalline aluminosilicate zeolites employed in this invention is that they be synthesized from a solution containing organic cations so that, as synthesized they contain an organic cation, nevertheless, the presence of an organic cation is not necessary during the actual use of these materials in the reforming process.

As has heretofore been pointed out, it has been found that zeolites possessing certain characteristics with respect to silica to alumina ratio, ability to sorb methyl paraffins and having been crystallized from solutions containing organic cations so that the zeolite in its synthesized state possesses an organic cation are uniquely useful in the upgrading of a reformate. However, it should be immediately understood that such zeolites can be subjected to conventional base exchange according to techniques well known in the art in order to replace all or a portion of the organic cations originally associated with these materials prior to use. Additionally, these materials can be heated to elevated temperatures so as to decompose the organic cations present in their "as synthesized" state. Therefore, the requirement that the zeolite contain an organic cation is only a requirement relating to the synthesis of the zeolite and not to the use of the zeolite.

It is also to be understood that this invention does not encompass zeolites that have been base exchanged with organic cations subsequent to their crystallization from solutions which do not contain organic cations. Thus, for example, this invention does not envision the use of a zeolite such as zeolite Y which has been dealuminized so as to increase its silica to alumina ratio and thereafter contacted with a solution such as tetrapropylammonium chloride. A material such as that is not one which has been crystallized from a solution containing an organic cation and such is a necessary prerequisite in optimizing a reformate or reformer effluent in accordance with this invention.

The zeolites used in the instant invention preferably have the original cations associated therewith replaced by a wide variety of other cations according to techniques well known in the art. Typical replacing cations would include hydrogen, ammonium and metal cations, including mixtures of the same. Of the replacing cations, particular preference is given to cations of hydrogen, ammonium, rare earth, magnesium, zinc, calcium, nickel, and mixtures thereof.

Typical ion exchange techniques would be to contact the particular zeolite with a salt of the desired replacing cation or cations. Although a wide variety of salts can be employed, particular preference is given to chlorides, nitrates and sulfates.

Representative ion exchange techniques are disclosed in a wide variety of patents including U.S. Pat. No. 3,140,249; 3,140,251; and 3,140,253.

Following contact with the salt solution of the desired replacing cation, the zeolites may be washed with water and dried at a temperature ranging from 150° F to about 600° F and thereafter heated in air or other inert gas at temperatures ranging from about 500° to 1,500° F for periods of time ranging from 1 to 48 hours or more.

It is also possible to treat the zeolite with steam at elevated temperatures ranging from 800° to 1,600° F and preferably 1,000° and 1,500° F, if such is desired. The treatment may be accomplished in atmospheres consisting partially or entirely of steam.

A similar treatment can be accomplished at lower temperatures and elevated pressures, e.g., 350°–700° F at 10 to about 200 atmospheres.

A preferred embodiment of this invention resides in the use of a porous matrix together with the zeolites previously described. The zeolites can be combined, dispersed or otherwise intimately admixed with a porous matrix in such proportions that the resulting product contains from one to 95 percent by weight, and preferably from 10 to 70 percent by weight of the zeolite in the final composite.

The term "porous matrix" includes inorganic compositions with which the aluminosilicates can be combined, dispersed or otherwise intimately admixed wherein the matrix may be active or inactive. It is to be understood that the porosity of the compositions employed as a matrix can either be inherent in the particular material or it can be introduced by mechanical or chemical means. Representative matrices which can be employed include metals and alloys thereof, sintered metals and sintered glass, asbestos, silicon carbide aggregates, pumice, firebrick, diatomaceous earths alumina, and inorganic oxides. Inorganic compositions especially those of a siliceous nature are preferred. Of these matrices, inorganic oxides such as clay, chemically treated clay, silica, silica-alumina, etc., are particularly preferred because of their superior porosity, attrition resistance, and stability.

Techniques for incorporating the zeolites in a matrix are conventional in the art and are set forth in U.S. Pat. No. 3,140,253.

As has heretofore been stated, the novel process of this invention resides in the conversion of a reformate or reformer effluent by contacting the same at conversion conditions in the presence of hydrogen with crystalline aluminosilicate zeolites characterized by (1) having a silica to alumina ratio greater than 15 (preferably greater than 20); (2) having been crystallized from a solution containing organic cations so that the alumino-silicate as synthesized contains organic cations and (3) having pore sizes such that the aluminosilicate sorbs methyl paraffins at said conversion conditions. The reformate or reformer effluent which is treated in accordance with the novel process of this invention is preferably one which contains substantially only aromatic and paraffinic constituents, although it is possible to tolerate naphthenes and olefins in the feed.

Reformates or reformer effluents which are composed substantially of aromatic and paraffinic constituents can be prepared according to conventional techniques by contacting any suitable material such as naphtha change material boiling in the range of about $C_5$ and preferably from about $C_6$ up to about 380° F and higher with hydrogen at least initially in contact with any conventional reforming catalyst. This is a conventional reforming operation which involves a net production of hydrogen and is disclosed in greater detail in United States Patent 3,395,094.

Conventional reforming catalysts include, for example, alumina in the eta, chi, or gamma form and mixtures thereof in combination with a chromium, molybdenum, or noble metal. Platinum type includes, for example, the metal series which includes platinum, palladium, osmium, iridium, ruthenium or rhodium and mixtures thereof deposited on a suitable support. Metals of Group VIIB, including rhenium, may be used in combination with platinum-type metals. Generally, the major portion of the catalyst will be alumina, which may comprise as much as about 95% by weight or more of the catalyst. Other components may be combined with the alumina carrier, such as the oxides or silica, magnesium, zirconium, thorium, vanadium, titanium, boron or mixtures thereof. The platinum-alumina combination, either with or without one or more of the above-listed components such as silica, etc., may also be promoted with small amounts of halogen such as chlorine and fluorine, in amounts ranging from about 0.1% up to about 5% by weight. Generally, less than about 3% of halogen is employed with the platinum type catalyst. In a preferred embodiment, the reforming catalyst carrier material is a relatively high surface area material, preferably an eta alumina material of at least about 100 square meters per gram.

In the reforming process, typical reforming operating conditions including temperatures in the range of from about 800° F to about 1,000° F, preferably from about 890° up to about 980° F, liquid hourly space-velocity in the range of from about 0.1 to about 10, preferably from about 0.5 to about 5; a pressure in the range of from about atmospheric up to about 700 psig and higher, preferably from about 100 to about 600 psig; and a hydrogen-hydrocarbon ratio in the range of from about 0.5 to about 20 and preferably from about 1 to about 10.

In the process of this invention, the reformate or reformer effluent is contacted with or without added hydrogen over a ZSM-5 type catalyst. As will be seen from the examples the process chemistry seems the same with or without the presence of hydrogen. Although there does not appear to be any chemical reason that makes hydrogen necessary in order to upgrade the reformate in accordance with the process of this invention, nevertheless, from a practical point of view it appears that the production of the reformate via a reforming reaction always results in the production of hydrogen and it would neither be necessary nor desirable to separate out this hydrogen which, in fact, may provide added benefits insofar as the catalyst is concerned, particularly with respect to stability. Practically, it is undesirable to separate out the hydrogen because it would add to processing cost, and because the reduced dilution of hydrogen recycled to the reformer associated with practicing the process of this invention improves the prior reforming operation. If it is to be immediately understood, however, that it is not necessary to have a hydrogenation/dehydrogenation component associated with the catalyst, although such is a preferred embodiment of this invention. Thus, in its broadest form this invention includes processing of a reformate or reformer effluent either in the absence or in the presence of hydrogen over the zeolite catalysts previously described with or without an added hydrogenation component.

The amount of the hydrogenation/dehydrogenation component employed is not narrowly critical and can range from about 0.01 to about 30 weight percent based on the entire catalyst. A variety of hydrogenation components may be combined with either the zeolite and/or matrix in any feasible manner which affords intimate contact of the components, employing well known techniques such as base exchange, impregnation, coprecipitation, cogellation, mechanical admixture of one component with the other, and the like. The hydrogenation component can include metals, oxides, and sulfides of metals of the Periodic Table which fall in Group VIB including chromium, molybdenum, tungsten and the like; Group IIB including zinc cadmium, Group VIIB including manganese and rhenium and Group VIII including cobalt, nickel, platinum, palladium, ruthenium, rhodium and the like, and combinations of metals, sulfides and oxides of metals of Group VIB and VIII, such as nickel-tungsten-sulfide, cobalt oxide-molybdenum oxide and the like.

The pre-treatment before use varies depending on the hydrogenation component present. For example, with components such as nickel-tungsten and cobalt molybdenum, the catalyst is sulfur activated as by sulfiding. With metals like platinum or palladium, a hydrogenation step is employed. These techniques are well known in the art and are accomplished in a conventional manner.

Conversion in accordance with the present process is generally carried out at a temperature between 500° F and about 1,000° F and preferably 550°-850° F. The hydrogen pressure, if such is used, in such operation is generally within the range of about 100 and about 3,000 psig and preferably about 350 to about 2,000 psig. The liquid hourly space velocity, i.e., the liquid volume of hydrocarbon per hour per volume of catalyst is about 0.1 and about 250, and preferably between about 1 and 100. In general the molar ratio of hydrogen to hydrocarbon change employed is between about 1 and about 80, and preferably between about 2 and about 15.

The aforementioned conditions of temperature and pressure for carrying out the novel process of this invention are generally applicable over their entire range when the zeolite catalyst employed does not possess hydrogenation/dehydrogenation activity.

When hydrogenation/dehydrogenation activity is associated with the zeolite catalyst, greater care must be taken in choosing conditions of temperature and pressure so that aromatics present in the reformate or reformer effluent are not hydrogenated.

It has now been found that within the range of process conditions employed for carrying out conversion with the instant zeolite catalyst, there are certain ranges of temperature and pressure within said broad range wherein it is thermodynamically possible to hydrogenate aromatics and there are ranges of temperature and pressure wherein it is thermodynamically impossible to hydrogenate aromatic compounds. Thus, although the selective hydrocracking of normal paraffins and the hydrogenation of olefins can take place at a fairly wide range of temperatures and pressures, the hydrogenation of aromatic compounds is thermodynamically feasible only within a narrower range of the temperatures and pressures utilized in conversions with the instant catalysts which have hydrogenation activity.

The selectivity in the hydrogenation/dehydrogenation function is achieved in one of two general procedures. The selective conversion operation is carried out at such conditions of temperature and pressure that prevent substantial hydrogenation of aromatics, in which case a broad range of hydrogenation/dehydrogenation catalyst components can be associated with the zeolite catalysts.

The sole exception to this general principle resides in the fact that certain hydrogenation components cannot be used which cause destructive hydrogenolysis of aromatics and in this connection, the materials which have such exceptionally high activity and fall within Group VIII of the Periodic Table should be avoided.

The second way in which an effective process can be obtained is to employ those conditions of temperature and pressure wherein it is, in fact, thermodynamically possible to hydrogenate aromatics, but to operate with low levels of hydrogenation components such that insufficient hydrogenation/dehydrogenation activity is present to catalyze the hydrogenation of aromatics.

Thus, it can be seen that the process of this invention resides in the use of hydrogenation/dehydrogenation components of any strength short of causing destructive hydrogenolysis of aromatics in those situations wherein temperatures and pressures are employed wherein it is thermodynamically impossible to hydrogenate aromatics and the use of hydrogenation/dehydrogenation components having mild hydrogenation activity when using conditions of temperature and pressure such that it is thermodynamically possible to hydrogenate aromatics.

This will be better understood by reference to the accompanying drawings wherein.

The three curves represent the temperature and pressure required to hydrogenate 10 weight percent of the aromatics in a charge stock at hydrogen to aromatics ratios of 2.5:1, 10:1, and 40:1, respectively.

To the left of said curves an area designated as A represents those conditions of temperature and pressure wherein it is thermodynamically possible to hydrogenate more than 10 weight percent aromatics; and To the right of said curves represents an area identified as B wherein it is thermodynamically impossible to hydrogenate aromatic compounds, i.e., less than 10 weight percent conversion.

Figure 1:
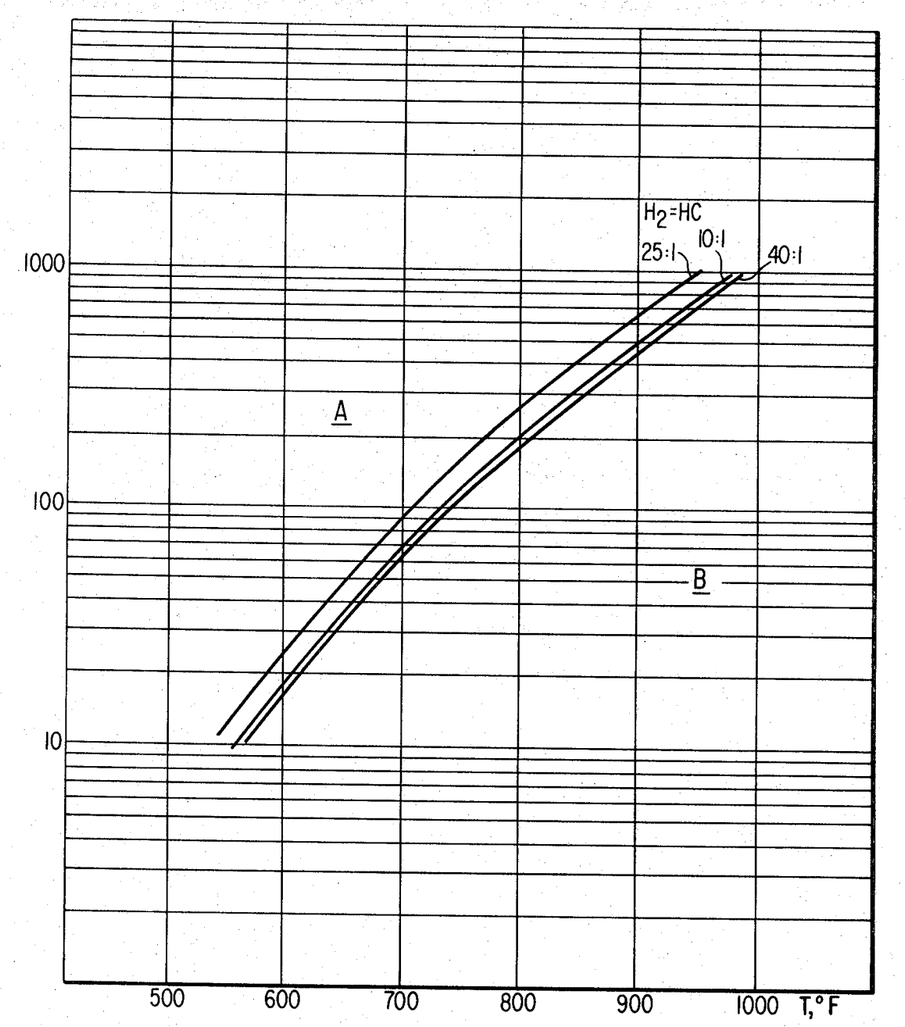
The FIGURE shows three curves and represents a graph of those operating conditions wherein the selective conversion with the type B catalyst is carried out.

Thus, when operating in those set of conditions defined by area B, any hydrogenation/dehydrogenation component can be employed of any strength so long as destructive hydrogenation of aromatics does not occur. Thus, when operating in area B, metals of Group IB, IIB, V, VI and VII of the Periodic Table, including the oxides and sulfides thereof, can be employed in any amount and in any concentration since under these conditions all the olefins will be hydrogenated and aromatics will be substantially unaffected. As has been previously set forth, it would not be possible to employ metals of the Group VIII of the Periodic Table since these metals contain too high activity and would cause destructive hydrogenolysis of benzene. It is to be noted, however, that Group VIII metals and compounds thereof can be employed if their activity is lessened or deactivated by pre-treatment, coking or addition of a deactivant to the charge to a level such that negligible benzene conversion does occur.

When operations are carried out at conditions of temperature and pressure falling with area A of said graph, then the choice of the hydrogenation/dehydrogenation component becomes more critical. In this type of operation, it is possible to use hydrogenation components falling within Group IB and Group IIB of the Periodic Table in any concentration since it has been found that these materials do not possess sufficient hydrogenation/dehydrogenation activity to hydrogenate aromatics at these conditions. If hydrogenation components selected from Groups V, VI and VII of the Periodic Table are to be employed, then these materials must be used at sufficiently low concentration to have negligible aromatic hydrogenation activity. In this connection, it has been found that the amount of these materials should range from about 0.05 to about 4.5 weight percent based on the total weight of hydrogenation component and aluminosilicate. Particularly preferred concentrations are from 0.2 percent to about 3 weight percent of the hydrogenation component.

Quite obviously, metals from Group VIII of the Periodic Table, as well as their oxides or sulfides are not suitable for use since the activity of these materials is so high that hydrogenation of aromatics will occur. However, in like manner, as when operating in those conditions defined by A, it is possible to employ these compounds, providing the activity thereof has been sufficiently reduced so that negligible hydrogenation of aromatic compounds occurs.

In order to determine whether or not the hydrogenation activity of a candidate catalyst is such that "negligible hydrogenation of aromatic compounds occurs," i.e., as a result of deliberately deactivating a Group VIII metal catalyst or using low concentration of Groups V, VI and VII, a convenient test method has been developed so that it can be very quickly and easily determined whether or not a particular catalyst is suitable.

In this test method a candidate catalyst, i.e., a zeolite having hydrogenation/dehydrogenation activity, is contacted with a hydrocarbon mixture containing about 50 weight percent benzene, 25 weight percent n-hexane and 25 weight percent isohexane at a pressure of 200 psig, a temperature of 700° F, a LHSV of 4.0 (with respect to total hydrocarbons) and a hydrogen to benzene mole ratio of 30:1. The contact is carried out for 60 minutes and the reactor effluent is thereafter analyzed periodically, e.g., at 15 minutes and 45 minutes. If less than 10 weight percent of benzene is converted by hydrogenation, the catalyst is suitable as to hydrogenation activity for use in the novel process of this invention.

When operating at those conditions wherein it is thermodynamically impossible to hydrogenate aromatics, i.e., areas A in FIG. 1, a simple test method has also been devised to determine whether or not the activity of Group VIII metal and compounds thereof have been sufficiently reduced so that destructive hydrogenolysis of aromatics does not occur.

In this test a zeolite having a Group VIII metal or compound thereof on its external surface is contacted with a mixture of 50 weight percent benzene, 25 weight percent n-hexane and 25 weight percent isohexane in an identical manner as above-described with the exception that the temperature of contact is 900° F. The remaining conditions are the same, i.e., pressure 200 psig, LHSV 4.0, hydrogen/benzene ratio 30:1. The reactor effluent is analyzed and if less than 10 weight percent of benzene is found to have been destroyed, the catalyst is deemed acceptable as to aromatics hydrogenolysis for use in the process of the instant invention.

The novel process of this invention can be carried out in a wide variety of techniques utilizing the process parameters previously set forth. Thus, it is possible to carry out this selective conversion in a separate reactor. In this embodiment a conventional reformer is operated so as to yield a reformate of the type previously set forth and then the reformate or reactor effluent, together with added hydrogen is passed into a separate reactor containing the zeolite catalyst previously set forth with or without a hydrogenation component in the manner previously set forth. In another embodiment of this invention a separate reactor need not be employed, but rather, the last reactor in a conventional three reactor reforming operation can be filled with a conventional platinum reforming catalyst and with the zeolite catalyst previously set forth so that the hydrocarbon feed first contacts the conventional platinum reforming catalyst and then zeolite catalyst. Thus, a feed material would undergo conventional reforming in the first two stages of a conventional reactor and then would enter into a third stage wherein conventional reforming would be carried out at the top of the reactor followed by the selective conversion in the bottom of the reactor followed by the selective conversion in the bottom of the reactor with the zeolite catalyst. This embodiment has the advantage of utilizing existing equipment and carrying out the novel process of this invention.

As has heretofore been pointed out, one embodiment of this invention resides in the introduction of a $C_5+$ highly paraffinic naphtha fraction into the reformate and reformer effluent which is being converted with the ZSM-5 type catalyst. As has been previously stated, it would appear that the novel process of this invention provides for the alkylation of the aromatic constituents of the charge thereby resulting in significantly upgraded products having enhanced economic value. The introduction of a highly paraffinic material such as Udex raffinate tends to increase the degree of alkylation attained thereby resulting in the obtainment of valuable products.

Although this invention has been described with respect to improved benefits stemming from increasing the octane number of the reformate, as well as increasing the yield octane relationship thereof, nevertheless, there are other advantages of the novel process of this invention over the heretofore practiced prior art techniques. One significant advantage is the fact that in practicing the process of this invention a greater hydrogen purity is obtained than the corresponding procedures of the prior art. Thus, for a given octane improvement in the upgrading of a reformate the novel process of this invention results in a higher degree of hydrogen purity due to the fact that there is an extremely low tendency to produce methane with the catalysts of this invention. A greater degree of hydrogen purity possesses obvious economic advantages.

The following examples will now illustrate the best mode contemplated for carrying out this invention.

EXAMPLES 1-2

These examples will illustrate the novel chemical reactions which are taking place when ZSM-5 type catalysts are used. In Example 1 n-octane was charged and in Example 2 an equal part by weight mixture of n-octane and benzene was charged. In each case the hydrogen form of ZSM-5 was employed and the following reaction conditions were used:

Pressure — 500 psig
Temperature, °F — 525
LHSV — 1
Hydrogen — None
The results were as follows:

| Overall Yields g/100 charge | Example 1 | Example 2 |
|---|---|---|
| $C_1$ | <0.1 | <0.1 |
| $C_2$ | 0.1 | <0.1 |
| $C_3$ | 4.1 | 4.0 |
| Butanes | 12.8 | 9.9 |
| Pentanes | 16.4 | 6.4 |
| $C_6$ Paraffins | 4.8 | 1.2 |
| $C_7$ Paraffins | 2.4 | 0.2 |
| $C_8$ Paraffins | 49.7 | 13.5 |
| Benzene | 1.1 | 33.3 |
| Alkylbenzenes ($C_{7-13}$) | 4.3 | 26.2 |
| Tetralins, Indanes | 0.6 | 3.8 |
| Naphthalenes | 0.2 | 0.6 |
| Naphthenes | 2.2 | 0.1 |
| Olefins | 1.8 | 0.9 |
| Totals: | 100.0g | 100.0g |

Of the 50.3g of n-octane disappearing from the charge of n-octane alone (Example 1), 40.6 g (81%) went to lower carbon number paraffins and 6.2 g (12%) to aromatics. Smaller amounts went to naphthenes (5%) and olefins (2%).

In Example 2, the charge had 50 weight percent aromatics whereas the product had 63.9 weight percent aromatics.

EXAMPLES 3-23

The following examples will illustrate the novel process of this invention. In each case the feed was a reformate obtained by contacting a mid-continent type naphtha together with hydrogen over a platinum reforming catalyst at 800–1,000° F and pressure of about 500 psig.

The reformate together with hydrogen was then contacted with a nickel-hydrogen exchanged ZSM-5 which was sulfided prior to use. Additional operating conditions as well as the results obtained are shown in the following table.

The above examples show the upgrading of a reformate by the novel process of this invention.

EXAMPLES 24–25

These examples will illustrate that improved results are obtained irrespective of whether or not a hydrogenation/dehydrogenation metal is associated with the ZSM-5 type zeolite.

The comparison below is made at 600° F, 400 psig, 5 LHXV, 2 $H_2$/HC mole ratio. Butane content of the charge was not the same and these are listed separately. Yields from the two catalysts do not differ significantly taking into consideration the higher octane number (1 unit) over H-ZSM-5.

|  | Example 24 (H-ZSM-5) | | Example 25 (Ni/H-ZSM-5) | |
| --- | --- | --- | --- | --- |
|  | Charge | Product | Charge | Product |
| $C_1$, wt. percent |  | 0.03 |  | 0.03 |
| $C_2^=$, wt. percent |  | .01 |  | .01 |
| $C_2$, wt. percent |  | .01 |  | .26 |
| $C_3^=$, wt. percent |  |  |  |  |
| $C_3$, wt. percent |  | 3.98 |  | 2.85 |
| Total dry gas, wt. percent |  | 4.03 |  | 3.15 |
| i-$C_4$, vol. percent | 2.0 | 4.9 | 0.7 | 3.1 |
| $C_4^=$, vol. percent |  | 0.1 |  |  |
| n-$C_4$, vol. percent | 4.8 | 7.0 | 2.8 | 3.9 |
| $C_4^+$, vol. percent | 100.0 | 93.1 | 100.0 | 93.2 |
| $C_5^+$, vol. percent | 93.2 | 81.1 | 96.5 | 86.0 |
| $C_6^+$, vol. percent | 77.2 | 71.3 | 80.1 | 75.6 |
| $C_5^+$ RON, clear | 90.3 | 98.9 | 90.3 | 97.6 |
| $C_6^+$ RON, clear | 92.4 | 101.0 | 92.4 | 99.7 |

EXAMPLES 26 – 27

These examples will illustrate the effect of hydrogen operating conditions and results are shown below:

|  | Charge | Example 26 Hydrogen | Example 27 No Hydrogen |
| --- | --- | --- | --- |
| Pressure, psig |  | 400 | 500 |
| $H_2$/HC Mole Ratio |  | 2 | — |
| LHSV |  | 5 | 1 |
| Temperature, °F |  | 600 | 604 |
| Dry Gas, Wt. % |  | 4.03 | 7.38 |
| $C_4$'s, Vol. % | 6.8 | 12.0 | 16.8 |
| $C_5^+$, Vol. % | 93.2 | 81.1 | 76.0 |
| $C_5^+$ RON, Clear | 90.3 | 98.9 | 98.9 |
| Run No. |  | PS-511 | CT-144-21-2 |

As can be seen from the above results, liquid yield is much higher and dry gas much lower in the presence of hydrogen.

EXAMPLES 28–34

The following table will show the fate of the $C_5^+$ paraffins that are converted. As can be seen, in all cases alkyl aromatics were increased.

FATE OF C₅⁺ PARAFFINS

| g/100 g charge | 28 600°F | 29 655°F | 30 707°F | 31 805°F | 32 901°F | 33 917°F | 34 933°F |
|---|---|---|---|---|---|---|---|
| Disappearance of $C_5^+$ paraffins | 18.03 | 14.04 | 14.34 | 12.39 | 16.22 | 18.21 | 18.24 |
| Appearance of: | | | | | | | |
| $C_1$-$C_3$ | 3.15 | 2.54 | 2.83 | 3.53 | 5.95 | 6.10 | 8.04 |
| Incremental $C_4$'s | 2.74 | 1.99 | 1.99 | 1.73 | 2.53 | 1.73 | 2.73 |
| Incremental alkyl benzene ring carbon | 4.96 | 3.64 | 3.96 | 4.31 | 4.35 | 6.83 | 5.49 |
| Incremental alkyl benzene side chain | 3.54 | 2.77 | 2.67 | 1.88 | 1.41 | 2.34 | 1.22 |
| | 14.40 | 10.94 | 11.45 | 11.45 | 14.24 | 17.00 | 17.48 |

EXAMPLE 35

The following examples will illustrate a nickel H-ZSM-5 zeolite used in Examples 3–23 and 25–34.

The following solutions were prepared.

a. 1.0 lbs of sodium aluminate containing 41.8 weight percent $Al_2O_3$ and 25 lbs of water;

b. 79.9 lbs of Q blend sodium silicate in 100 lbs of water, i.e., 28.9 weight percent $SiO_2$, 9.0 weight percent $Na_2O$, 62.1 weight percent $H_2O$;

c. 10.0 lbs of tetrapropylammonium bromide and 50 lbs of water;

d. 7.97 lbs of sulfuric acid in 24 lbs of water.

Solution (c) was added to solution (b) and then solution (a) was added to a mixture of (c) and (b). Solution (d) was then added to the mixture of (a), (b), and (c) with rapid stirring. A gel was formed and the mixture was maintained at a temperature of from about 195°–210° F for approximately 267.5 hours until crystallization was complete and ZSM-5 was formed. After filtration the wet cake was mixed with water, washed and then dried at 250° F. After drying it was calcined 3 hours at 700° F.

The calcined ZSM-5 was then subjected to four 1-hr exchanges with 1.0 N ammonium nitrate solution at room temperature.

The ammonium exchanged zeolite was then subjected to a four-hour exchange with a 0.5 nickel nitrate solution at 190° F.

The exchanged material was then washed free of nickel solution, dried at 250° F, sized 30–60 mesh and then calcined for 10 hours at 1,000° F.

The calcined ZSM-5 was then sulfided with a mixture of about 2 weight percent hydrogen sulfide in hydrogen at 750° F.

The catalyst contained 0.11 weight percent sulfur, 0.32 weight percent nickel and 0.02 weight percent sodium.

EXAMPLE 36

The following example will illustrate the preparation of the hydrogen/ZSM-5 zeolite which was used in Examples 1, 2 and 24. The following solutions were prepared:

a. 0.56 lbs of sodium aluminate containing 44.7% aluminum oxide and 14 lbs of water;

b. 44.7 lbs of a Q brand sodium silicate and 56 lbs of $H_2O$;

c. 5.6 lbs of tetrapropylammonium bromide and 28 lbs of $H_2O$;

d. 4.47 lbs of sulfuric acid in 14 lbs of water.

Solution (c) was added to solution (b) and then solution (a) was added to a mixture of (c) and (b). Solution (d) was then added to the mixture of (c), (b), and (a) with rapid stirring. A firm gel was formed at the end of adding solution (d).

The gel was heated at a temperature of 200°–210° F for a total of 167 hours until a crystalline aluminosilicate identified as ZSM-5 was formed.

The ZSM-5 zeolite was dried, calcined in air for 10 hours at 1,000° F, and then base exchanged with a 1.0 N aqueous solution of ammonium chloride at room temperature until the sodium content had been reduced to 0.01 weight percent.

The ammonium exchanged ZSM-5 zeolite was sized 30-60 mesh and then calcined at 1,000° F overnight.

EXAMPLES 37-42

A $C_6$ reformate effluent system was simulated by the blending of 50% benzene with 25% n-hexane and 25% isohexane. The material was then contacted with various forms of ZSM-5 catalysts at 200 psi 15/1 molar hydrogen/hydrocarbon ratio, at 4 LHSV, and 700° F. High conversion to eliminate the low octane number component and enrichment thereby of the high octane number were observed as follows:

| | | Wt % Conversion | | |
|---|---|---|---|---|
| Examples | Catalyst | n-hexane | 2-methyl pentane | benzene |
| 37 | HZSM-5 | 97.9 | 43.3 | 12.5 |
| 38 | NaHZSM-5 | 28.5 | 2.1 | 4.2 |
| 39 | Zn/H/ZSM-5 0.87% Zn | 81.2 | 31.5 | 14.0 |
| 40 | Ni/H/ZSM-5 0.20% Ni | 73.4 | 23.4 | 5.7 |
| 41 | Zn/H/ZSM-5 1.21% Zn | 41.8 | 14.0 | 4.5 |
| 42 | Ni/H/ZSM-5 0.31% Ni | 98.0 | 55.7 | 15.5 |

EXAMPLE 43

To compare the performance of ZSM-5 with previously known shape selective 5A catalysts, a nickel hydrogen erionite was contacted with the same synthetic reformate blend used in Examples 37–43 and the results are shown below:

| | | Wt. % Conversion | |
|---|---|---|---|
| Catalyst | n-hexane | 2-methyl pentane | benzene |
| Ni/H/erionite | 85.4 | 3.1 | 2.6 |

ZSM-5 catalysts in H, Zn/H, and Ni/H forms are more active than nickel/H-erionite in cracking n-hexane, and unlike nickel/H/erionite, they also convert significantly more 2-methyl pentane and benzene. In the liquid product collected from the ZSM-5 runs large amounts of $C_7^+$ alkylaromatics were found apparently the result of alkylation of benzene with the cracked fragments. A typical canalysis of the liquid product collected at room temperature is shown as follows:

Composition of Liquid Product from Example 40

|  | Wt% |
|---|---|
| 2-methyl pentane | 1.5 |
| n-hexane | 0.8 |
| benzene | 12.2 |
| Toluene | 1.2 |
| $C_8$ aromatics | 30.2 |
| $C_9^+$ aromatics | 54.1 |
| Total: | 100.0 |

EXAMPLES 44–47

To compare the performance of ZSM-5 with previously known shape selective acid cracking catalysts, a hydrogen T prepared by calcining an ammonium exchanged zeolite T was contacted with the same synthetic reformate blend used in Examples 37–42 and reactor effluent was analyzed after on stream for 15 minutes and 3 hours, respectively.

The results are shown as follows:

| Ex. | Catalyst | n-hexane | 2-methyl pentane | benzene |
|---|---|---|---|---|
|  |  | Wt % Conversion (15 min on stream) | | |
| 44 | H/T | 58.5 | 3.3 | 0.6 |
| 45 | H/ZSM-5 | 97.9 | 43.3 | 12.5 |
|  |  | Wt % Conversion (3 hrs on stream) | | |
| 46 | H/T | 29.7 | 0.5 | 0.6 |
| 47 | H/ZSM-5 | 97.8 | 24.5 | 12.1 |

These results demonstrated the remarkable activity and non-aging characteristics of H/ZSM-5 without added hydrogenation/dehydrogenation component under hydrocracking conditions. H/T, on the other hand, aged considerably in 3 hours.

EXAMPLE 48

This example will illustrate a typical preparation of zeolite ZSM-5 used in Example 38.

22.9 grams $SiO_2$ was partially dissolved in 100 ml 2.18N tetrapropylammonium hydroxide by heating to a temperature of about 100° C. There was then added a mixture of 3.19 grams $NaAlO_2$ (comp: 42.0 wt. percent $Al_2O_3$, 30.9 percent $Na_2O$, 27.1 percent $H_2O$) dissolved in 53.8 ml $H_2O$. The resultant mixture had the following composition: 0.382 mole $SiO_2$, 0.0131 mole $Al_2O_3$, 0.0159 mole $Na_2O$, 0.118 mole $[(CH_3CH_2CH_2)_4N]_2O$, 6.30 moles $H_2O$. The mixture was placed in a pyrex-lined autoclave and heated at 150° C for 6 days. The resultant solid product was cooled to room temperature, removed, filtered, washed with 1 liter $H_2O$ and dried at 230° F. A portion of this product was subjected to X-ray analysis and identified as ZSM-5. A portion of the product was calcined at 1,000° F in air for 16 hours and the following analyses were obtained:

| Wt. % $SiO_2$ | 93.62 | Wt. % n-hexane adsorbed | 10.87 |
|---|---|---|---|
| Wt. % $Al_2O_3$ | 4.9 | Wt.% cyclohexane adsorbed | 3.60 |
| Wt. % $Na_2O$ | 1.48 | Wt.% $H_2O$ adsorbed | 9.15 |
|  | 100.00 |  |  |
| $SiO_2/Al_2O_3$ | 32.5 |  |  |
| $Na_2O/Al_2O_3$ | 0.5 |  |  |

EXAMPLE 49

This example will illustrate the general procedure for the preparation of H-ZSM-5 used in Examples 37, 45 and 47.

A ZSM-5 zeolite was prepared in accordance with the general technique set forth in Example 48; it was then contacted with a saturated solution of ammonium chloride in order to replace the original cations associated therewith and thereafter washed with water, dried and calcined in air at about 1,000° F in order to convert it to the hydrogen form, i.e., H-ZSM-5.

EXAMPLE 50

A ZSM-5 type catalyst was prepared following the general procedure of Example 48. The reaction composition and characteristics of the finished product are as follows:

Temp., °C — 150
Time, Days — 5
Reaction Composition
  $SiO_3/Al_2O_3$ — 29.1
  $Na_2O/Al_2O_3$ — 1.19
  $TPA_2O/Al_2O_3$ — 9
  $H_2O/TPA_2O + Na_2O$ — 47
Composition
  $Na_2O$, Wt. percent — 2.42
  Na, Wt. percent — 1.8
  $Al_2O_3$, Wt. percent — 6.1
  $SiO_2$, Wt. percent — 90.6
  $SiO_2/Al_2O_3$ — 25.2
  $Na_2O/Al_2O_3$ — 0.65
Adsorption – Cyclohexane, Wt. percent — 3.07
  Normal Hexane, Wt. percent — 9.88
  $H_2O$, Wt. percent — 7.51

The above material was then calcined at about 1,000° F for 16 hours and divided into two portions (A and B). Portion A was exchanged with 100 ml of a 0.5N aqueous solution of ammonium chloride at room temperature for 1 hour to form the ammonium salt. This was labeled Catalyst A1. Three grams of Catalyst A1 was exchanged with 35 ml of a 0.5N 2.9/1 zinc/$NH_4$ chloride solution at 109° F for 4 hours. The material was then washed with water and dried in air to yield a catalyst having a zinc content of 0.9 weight percent and a sodium content of 0.2 weight percent. After calcination at 1,000° F for 16 hours, it was used in Example 39.

Portion B was treated with anhydrous ammonia (100 cc per minute) at room temperature to reconstitute the $NH_4$ sites. This catalyst was labeled B1. Three grams of Catalyst B1 was exchanged with a 0.5N solution of zinc and ammonium chloride as above. The finished catalyst contained 1.2 weight percent zinc and 0.3 weight percent sodium. After calcination at 1,000° F for 16 hours, it was used in Example 41.

The catalysts used in Examples 40 and 42 were prepared in a similar manner except that a nickel salt as used to base exchange the zeolite instead of a zinc salt.

EXAMPLE 51

This example will illustrate the effect of the absence of hydrogen and the results are shown below:

A charge was contacted over a Ni/H/ZSM-5 type zeolite. Properties of the charge, as well as operating conditions and results are shown below:

|  | Charge | Example 51 |
|---|---|---|
| Pressure, psig |  | 500 |
| $H_2$/HC Mole Ratio |  | — |
| LHSV |  | 1 |
| Temperature, °F |  | 604 |
| Dry Gas, Wt. % |  | 7.38 |
| $C_4$'s, Vol. % | 6.8 | 16.8 |
| $C_5^+$'s, Vol. % | 93.2 | 76.0 |
| $C_5$+ RON, Clear | 90.3 | 98.9 |

EXAMPLE 52

In this experiment a synthetic $C_6$ reformate was converted over an acid exchanged ZSM-5 zeolite catalyst. The $C_6$ reformate charge was of the following composition:

| Component | % By Volume |
|---|---|
| 2,2-Dimethylbutane | 10.5% |
| 2,3-Dimethylbutane | 6.2% |
| 2-Methylpentane | 15.3% |
| n-Hexene-1 | 5.8% |
| Benzene | 40.4% |
| n-Hexane | 21.8% |

This composition had an octane number (ON) of 77.1.

In this experiment, the above charge was converted by passage over an acid exchanged ZSM-5 zeolite at 100–200 WHSV at 900°–950° F. More precisely, the reaction was conducted at 100 WHSV and 900° F and the characteristics of the final product were noted below.

Octane Improvement—The synthetic reformate has a calculated clear octane number (R+O) of 77.1. [The measured micro-octane number is 77.6 (R+O)]. At 100 WHSV and 900° F the modified fuel obtained had an initial clear octane number of 92.3, calculated from the composition of products. Thus, a gain of 15.2 octane numbers was achieved by conversion over the zeolite.

This gain in octane number was achieved by: (1) cracking 62.9 weight percent of the n-hexane and 12.5 weight percent of the 2-methylpentane and 2,3-dimethylbutane to $C_4$- olefins and paraffins and (2) alkylating 19.5 weight percent of the benzene to $C_7$ to $C_{10}$ alkyl aromatics. A negligible amount of 2,2-dimethylbutane was converted.

The modified fuel thus contains 20.3 volume percent $C_3$'s and 3.6 volume percent $C_4$'s and 76.1 volume percent $C_6$+'s.

EXAMPLE 53

In this experiment an 86.0 (R+O) octane number 400° F end point reformate from a platinum reformer was converted over an acid exchanged ZSM-5 zeolite catalyst. The catalyst had an alpha value of 13,000. The charge stock has the following analysis:

Average molecular weight: 96.5
Octane number: (Lead Free) Research method: 86.0
Paraffins: 57.3 wt. percent
Olefins: 1.1; Motor method: 79.5
Alkylbenzenes: 38.6
Others (by difference) 3.0
100.0

The experiment was carried out in the same manner as in Example 1. The liquid product was collected and its octane number measured by the standard octane rating engine. The gaseous product was analyzed by the gas chromatographic method. A calculated octane number of 92.4 (R+O) was obtained by combining the octane values of the individual gases with the measured octane value of the liquid product. Thus, a gain of 6.4 octane numbers was achieved by conversion over the zeolite.

EXAMPLE 54

In this experiment an 81.2 (R + O) reformate from a platinum reformer was used, the test procedure was the same as in Example 51. The charge stock has the following analysis:

| | | |
|---|---|---|
| Average molecular weight | | 89.2 |
| Paraffins | | 68.3 Wt. % |
| Olefins | | 1.5 |
| Alkylbenzenes | | 29.4 |
| Others (by difference) | | 0.8 |
| | Total: | 100.0 |

The octane rating of the liquid product and that of the modified fuel (liquid plus gas) are shown as follows:

| On Stream Time | Liquid Only | Modified Fuel |
|---|---|---|
| 20 minutes | 91.3 | 93.8 |
| 3 hours, 40 minutes | 88.7 | 90.8 |

A gain of 12.6 and 9.6 octane numbers over the reformate charge was realized.

EXAMPLE 55

The following example will illustrate a nickel H-ZSM-5 zeolite used in Example 51.

The following solutions were prepared.

a. 1.0 lbs. of sodium aluminate containing 41.8 weight percent $Al_2O_3$ and 25 lbs. of water;
b. 79.9 lbs. of Q blend sodium silicate in 100 lbs. of water, i.e., 28.9 weight percent $SiO_2$, 9.0 weight percent $Na_2O$, 62.1 weight percent $H_2O$;
c. 10.0 lbs. of tetrapropylammonium bromide and 50 lbs. of water;
d. 7.97 lbs. of sulfuric acid in 24 lbs. of water.

Solution (c) was added to solution (b) and then solution (a) was added to a mixture of (c) and (b). Solution (d) was then added to the mixture of (a), (b), and (c) with rapid stirring. A gel was formed and the mixture was maintained at a temperature of from about 195°–210° F for approximately 267.5 hours until crystallization was complete and ZSM-5 was formed. After filtration the wet cake was mixed with water, washed and then dried at 250° F. After drying it was calcined 3 hours at 700° F.

The calcined ZSM-5 was then subjected to four 1-hour exchanges with 1.0 N ammonium nitrate solution at room temperature.

The ammonium exchanged zeolite was then subjected to a four-hour exchange with a 0.5 N nickel nitrate solution at 190° F.

The exchanged material was then washed free of nickel solution, dried at 250° F, sized 30–60 mesh and then calcined for 10 hours at 1,000° F.

The calcined ZSM-5 was then sulfided with a mixture of about 2 weight percent hydrogen sulfide in hydrogen at 750° F.

The catalyst contained 0.11 weight percent sulfur, 0.32 weight percent nickel and 0.02 weight percent sodium.

EXAMPLE 56

The following example will illustrate the preparation of the hydrogen/ZSM-5 zeolite which was used in Examples 52, 53 and 54. The following solutions were prepared:

a. 0.56 lbs. of sodium aluminate containing 44.7% aluminum oxide and 14 lbs. of water;
b. 44.7 lbs. of a Q brand sodium silicate and 56 lbs. of $H_2O$;
c. 5.6 lbs. of tetrapropylammonium bromide and 28 lbs. of $H_2O$;
d. 4.47 lbs. of sulfuric acid in 14 lbs. of water.

Solution (c) was added to solution (b) and then solution (a) was added to a mixture of (c) and (b). Solution (d) was then added to the mixture of (c), (b), and (a) with rapid stirring. A firm gel was formed at the end of adding solution (d).

The gel was heated at a temperature of 200°–210° F for a total of 167 hours until a crystalline aluminosilicate identified as ZSM-5 was formed.

The ZSM-5 zeolite was dried, calcined in air for 10 hours at 1,000° F, and then base exchanged with a 1.0 N aqueous solution of ammonium chloride at room temperature until the sodium content had been reduced to 0.01 weight percent.

The ammonium exchanged ZSM-5 zeolite was sized 30–60 mesh and then calcined at 1,000 F overnight.

EXAMPLES 57–65

These examples are directed towards a screening test for evaluating whether or not a candidate zeolite will be effective in the novel process of this invention.

In these examples, equal parts by weight of benzene and n-heptane were charged over various candidate catalysts and the conversion of benzene and heptane was measured.

The conditions employed were as follows:
Temperature — 600°–900° F
Pressure — 0–400 psig
WHSV — 0.4–62
$H_2/HC$ — 0–7

The reason for the large variation in operating conditions was an attempt to obtain the best result for each catalyst tested. Thus, all candidate catalysts were first tested at the following conditions:
750°F
400 psig
62 WHSV
7/1 $H_2/HC$ Those which failed the test were retested at different conditions within the broad range above-noted in an attempt to improve their performance.

The following table will show the best results of testing, as well as the temperatures employed.

| Example | Zeolite | Organic cation | $SiO_2/Al_2O_3$ | n-heptane cracked wt. percent | Benzene converted wt. percent | Temp. °F |
|---|---|---|---|---|---|---|
| 57 | TMA offretite | Yes | 8.0 | 15 | 1.5 | 800 |
| 58 | ZSM-4 | Yes | 6.7 | 8 | 0.1 | 750 |
| 59 | Mordenite (dealuminized) | No | 24 | 9 | 2 | 750 |
| 60 | TEA Mordenite | Yes | 32 | 61 | 18.5 | 900 |
| 61 | Beta | Yes | 30 | 68 | 10.5 | 900 |
| 62 | ZSM-5 | Yes | 30–70 | 80 | 28 | 600 |
| 63 | ZSM-8 | Yes | 53 | 61 | 15 | 750 |
| 64 | ZSM-11 | Yes | 76 | 38 | 15.5 | 600 |
| 65 | ZSM-12 | Yes | 52 | 52 | 18 | 750 |

From the above table, it can be seen that there is a decided difference in catalytic behavior among the zeolites that were tested. At the outset, it is pointed out that all the zeolites tested above have the ability to sorb monomethyl paraffins at the conversion conditions used. Thus, the differences between the zeolites resides in whether they were synthesized so as to contain an organic cation and in their silica to alumina ratio.

From the table, it can be seen that materials such as TMA offretite, ZSM-4 and mordenite simply do not function in a desirable manner. With respect to TMA offretite it can be seen that its cracking of heptane and conversion of benzene is too low even at temperatures of 800° F. As can be seen, TMA offretite does not fit within the definition of the preferred zeolites since its silica to alumina ratio is below 15. Similarly, ZSM-4, although containing an organic cation and being able to sorb monomethyl paraffins, also does not test out as being a good catalyst with respect to its conversion of heptane and benzene and as can be seen from the above table, it has a silica to alumina ratio below the 15 required.

The above table also illustrates that it is not merely a silica to alumina ratio which imparts improved catalytic properties. Reference is directed towards mordenite which was synthesized in a conventional manner and then dealuminized so as to raise its silica to alumina ratio to 24. As can be seen from the table, it too possessed inferior catalytic properties with respect to heptane and benzene conversion, thereby rendering it effective as a reformate upgrading catalyst in accordance with the teachings of this invention.

All the remaining zeolites gave good results as is evident from the fact that it converted substantial amounts of heptane and benzene.

What is claimed is:

1. A process for upgrading reformates and reformer effluents which comprises contacting the same at conversion conditions with a crystalline aluminosilicate zeolite characterized by: (1) having a silica to alumina ratio greater than 15; (2) having been crystallized from a solution containing organic cations so that it contains organic cations as synthesized; and (3) having a pore size such that it sorbs methyl paraffins at said conversion conditions so as to alkylate a portion of the aromatic rings contained in said reformates and reformer effluents.

2. The process of claim 1 wherein the crystalline aluminosilicate zeolite has a silica-to-alumina ratio greater than 20.

3. The process of claim 2 wherein said crystalline aluminosilicate zeolite also has a hydrogenation/dehydrogenation component associated therewith.

4. The process of claim 2 wherein the crystalline aluminosilicate has been base exchanged with ammonium or hydrogen cations.

5. The process of claim 2 wherein the crystalline aluminosilicate is zeolite Beta.

6. The process of claim 2 wherein said crystalline aluminosilicate is TEA mordenite.

7. The process of claim 2 wherein said crystalline aluminosilicate is zeolite ZSM-12.

8. The process of claim 5 wherein the zeolite has been base exchanged with ammonium or hydrogen cations.

9. The process of claim 6 wherein the zeolite has been base exchanged with ammonium or hydrogen cations.

10. The process of claim 7 wherein the zeolite has been base exchanged with ammonium or hydrogen cations.

11. The process of claim 8 wherein the zeolite material also has a hydrogenatin/dehydrogenation function.

12. The process of claim 9 wherein the zeolite material also has a hydrogenation/dehydrogenation function.

13. The process of claim 10 wherein the zeolite material also has a hydrogenation/dehydrogenation function.

14. A process for upgrading reformate and reformer effluent which comprises contacting the same with TEA mordenite.

15. The process of claim 14 wherein the TEA mordenite has a hydrogenation/dehydrogenation component associated therewith.

16. The process of claim 14 wherein the TEA mordenite has been base exchanged with ammonium or hydrogen ions.

* * * * *